US006568732B2

(12) United States Patent
De Gaillard

(10) Patent No.: US 6,568,732 B2
(45) Date of Patent: May 27, 2003

(54) CARGO SPACE COVER FOR PASSENGER VEHICLES

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/051,292

(22) Filed: Jan. 22, 2002

(65) Prior Publication Data

US 2002/0113450 A1 Aug. 22, 2002

(30) Foreign Application Priority Data

Jan. 22, 2001 (DE) .......................................... 101 02 792

(51) Int. Cl.[7] .............................................. B62D 33/04
(52) U.S. Cl. .................. 296/24.1; 296/37.8; 296/37.16; 296/98
(58) Field of Search ............................... 296/24.1, 37.8, 296/37.16, 37.15, 37.14, 98; 160/238

(56) References Cited

U.S. PATENT DOCUMENTS

| 3,472,548 | A | * | 10/1969 | Comisac ...................... 296/98 |
| 4,138,154 | A | * | 2/1979 | McKeon ....................... 296/98 |
| 4,252,362 | A | * | 2/1981 | Campbell ..................... 296/98 |
| 4,611,848 | A | * | 9/1986 | Romano ....................... 296/98 |
| 4,784,427 | A | * | 11/1988 | Burgess ....................... 296/98 |
| 4,786,099 | A | * | 11/1988 | Mount ......................... 296/98 |
| 4,795,206 | A | * | 1/1989 | Adams ......................... 296/98 |
| 4,807,921 | A | * | 2/1989 | Champie et al. ............... 296/98 |
| 4,889,381 | A | * | 12/1989 | Tamblyn et al. ............... 296/98 |
| 4,932,704 | A | * | 6/1990 | Ament ...................... 296/37.16 |
| 5,251,950 | A | * | 10/1993 | Bernardo ...................... 296/98 |
| 5,330,246 | A | * | 7/1994 | Bernardo ...................... 296/98 |
| 5,538,306 | A | * | 7/1996 | Ament ...................... 296/37.16 |
| 5,685,592 | A | * | 11/1997 | Heinz ....................... 296/37.16 |
| 6,030,021 | A | * | 2/2000 | Ronai .......................... 296/98 |
| 6,053,556 | A | * | 4/2000 | Webb .......................... 296/98 |
| 6,213,186 | B1 | * | 4/2001 | Torres et al. ............. 296/37.16 |
| 6,276,735 | B1 | * | 8/2001 | Champion .................... 296/98 |

FOREIGN PATENT DOCUMENTS

| DE | 198 25 353 A1 | 12/1998 |
| DE | 199 06 648 A1 | 8/2000 |

* cited by examiner

Primary Examiner—D. Glenn Dayoan
Assistant Examiner—Lori L Coletta
(74) Attorney, Agent, or Firm—Nixon Peabody LLP; David S. Safran

(57) ABSTRACT

A device for covering the cargo space of a passenger vehicle is provides which includes a cover shade, including flexurally stiff louvers, which is movably guided on lateral guide rails. To open the cargo space, the cover shade can be transferred into a storage position behind a seat arrangement. To facilitate handling, a drive device is connected to the cover shade for opening and closing the cover shade. The drive device may include a drive motor with two synchronously drivable drive cables which drive the cover shade on its two lengthwise sides to allow the cover shade to be easily removed from its storage position.

10 Claims, 5 Drawing Sheets

CARGO SPACE COVER FOR PASSENGER VEHICLES

BACKGROUND OF THE INVENTION

1. Field of the Invention

The invention relates to a device for covering the cargo space of a passenger vehicle with a cover shade including louvers, which is movably guided on lateral guide rails and can be transferred into a storage position behind a seat arrangement to open the cargo space.

2. Description of Related Art

Published German patent application DE 199 06 648 A1 discloses a louvered shade-cargo bottom which is also used as a luggage space cover for a passenger vehicle. The shade-cargo bottom is movably guided on lateral guide rails which are mounted on either side in the cargo space, and on guide rails which are mounted on lateral boundaries on the rear seat back of a seat arrangement. To open the shade-cargo bottom, it is manually pushed completely to the back of the rear seat back. The rear seat back is then folded forward to increase the size of the luggage space. The shade-cargo bottom can now be pushed to the rear on the bottom lateral guide rails and, with its bottom, can be used as a base for loading articles. The maximum length of the shade-cargo bottom corresponds to the height of the rear seat back.

Published German patent application DE 198 25 353 A1 discloses a cargo space cover for station wagons including a web-shaped, rollable cover shade which can be removed from the vehicle and also unrolled for closing against the spring force of a winding shaft. The cover shade can also be pulled out over the cargo space. The cover shade contains a retaining rod on its back end. The two ends of the retaining rod are detachably held on respective drivers. Each driver is part of a drive unit which movably guides the driver on the inner lengthwise sides of the cargo space. Each drive unit contains its own drive motor. To ensure synchronism of the two drive motors when the cover shade is pulled out, at least one of the two drive motors can be controlled by means of a rpm monitoring unit and a control unit with respect to its rpm.

SUMMARY OF THE INVENTION

Therefore, one object of the present invention is to provide a structurally simple cover device which can be easily operated and flexibly used.

The above object and other objects are achieved by providing a cover shade including flexurally stiff louvers and a drive means connected to the cover shade for opening and closing the shade. Instead of manual operation, the cover shade can be easily actuated by a motor via an actuating switch on the rear of the vehicle, on the rear gate and/or on the dashboard or generally in the area of the driver.

In one preferred embodiment, the drive means contains a drive motor with two synchronously drivable drive cables which drive the cover shade on its two lengthwise sides. The drive cables engage a driven wheel of step-down gearing and are synchronously moved at the same time so that the cover shade is uniformly guided on the guide rails on its lengthwise sides thereby preventing jamming or blocking. The drive cables run in a manner of Bowden cables from the drive motor to the guide rails and can thus be matched to the installation position in the vehicle and can be flexibly laid. The louvered cover shade can be moved in its guides by both pushing and pulling.

Feasibly, the opened cover shade can be removed from its storage position in order to increase the size of the cargo space for holding bulky items. If the cover shade can be rolled up on the front end or in the area of the, front end of the guide rails and is detachably connected to the drive means, the cover shade can be removed from its storage position as a rolled-up package. The cover shade is supported with the capacity to be wound up, for example, on the back rest of a seat arrangement bordering the cargo space, for example, a rear bench seat. The cover shade may be wound up in, for example, a holding means which is detachably connected to the seat back in a roughly cylindrical roll-up space. The cover shade with the holding means can be completely removed from the backrest. Alternatively, the cover shade can be folded forward with the foldable seat back, by which the cargo space is enlarged, but without the cover shade having to be completely removed. But in both cases it is especially preferred that the cover shade is coupled in a detachable connection to the drive parts of the drive means which are movably supported on the lateral guide rails. In this way, the cover shade can be easily decoupled completely from the drive.

The flexible connection between the drive motor and the guide rails formed by the drive cables makes it possible for the drive motor to be located under the cargo space bottom. The drive motor can then be located in the middle or to the side both on the front end and also on the back end of the cargo space bottom.

One alternative configuration calls for the cover shade to be deposited in a receiving means located on the seat back of a seat arrangement. The receiving means is preferably securely attached to the seat back and can be folded down with the seat back. The receiving means contains a lengthwise receiving space into which the cover shade is, for example, pushed or pulled through a top slotted opening. The individual louvers may be arranged in any manner tightly against one another to fill the receiving space while saving room.

Preferably, the receiving means, which is located behind the seat back, contains lateral guides for the cover shade which adjoin the guide rails when the seat back is folded up and which keep the cover shade in the receiving space in the orderly storage position.

When the lateral guides have a bottom, especially U-shaped guide section for deflecting the cover shade, a space-saving, two-layer storage position of the cover shade in the storage space is allowed by the cover shade, which is first guided downward, after its deflection being guided upward again. Thus, a comparatively long, louvered cover shade can be used which is also suitable for coverage also for long cargo spaces.

The drive means of the present invention has at least one compressively stiff drive cable which is guided on the receiving means and is connected to the cover shade. The drive motor of the drive means can be located, for example, on the seat arrangement and preferably in the area of the receiving means.

DETAILED DESCRIPTION OF THE INVENTION

Figure 1:
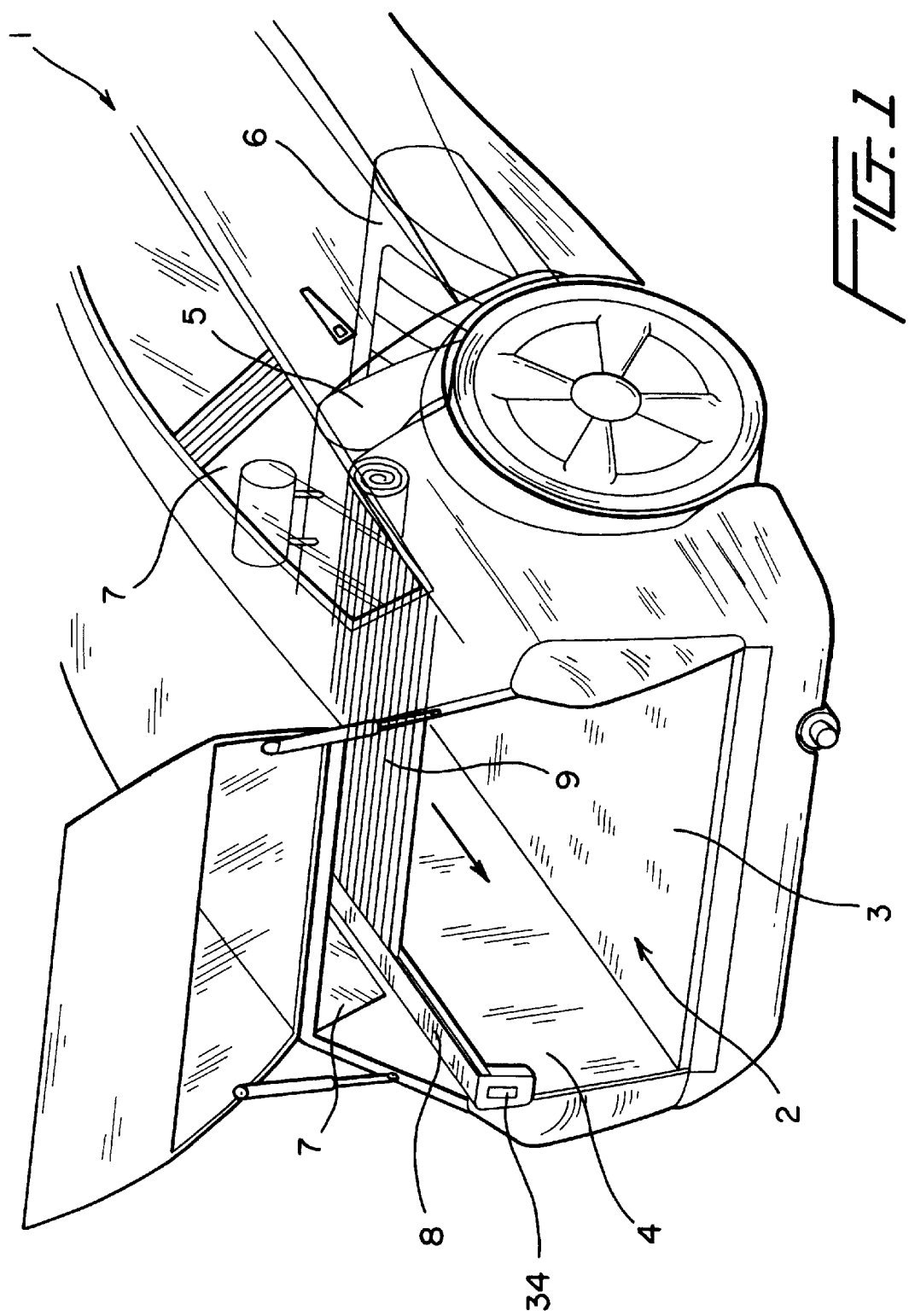
FIG. 1 is a perspective plan view of the rear of a station wagon with a cargo space and partially opened cover shade of the present invention.

Referring to FIG. 1, a station wagon 1 contains a cargo space 2 which is bordered by a cargo space bottom 3 and two side walls 4. A rear seat back 5 of a rear bench seat arrangement 6, the back of which can be folded preferably forward, forms the front boundary of the cargo space 2. On each side wall 4, underneath a rear side window 7, a guide rail 8 is attached on which a cover shade 9 is movably guided for covering the cargo space 2. The cover shade 9 consists of flexurally stiff louvers 10, for example aluminum louvers, which have a strength such that articles weighing up to, for example, 20 kg can be placed on the cover shade 9.

Figure 2:
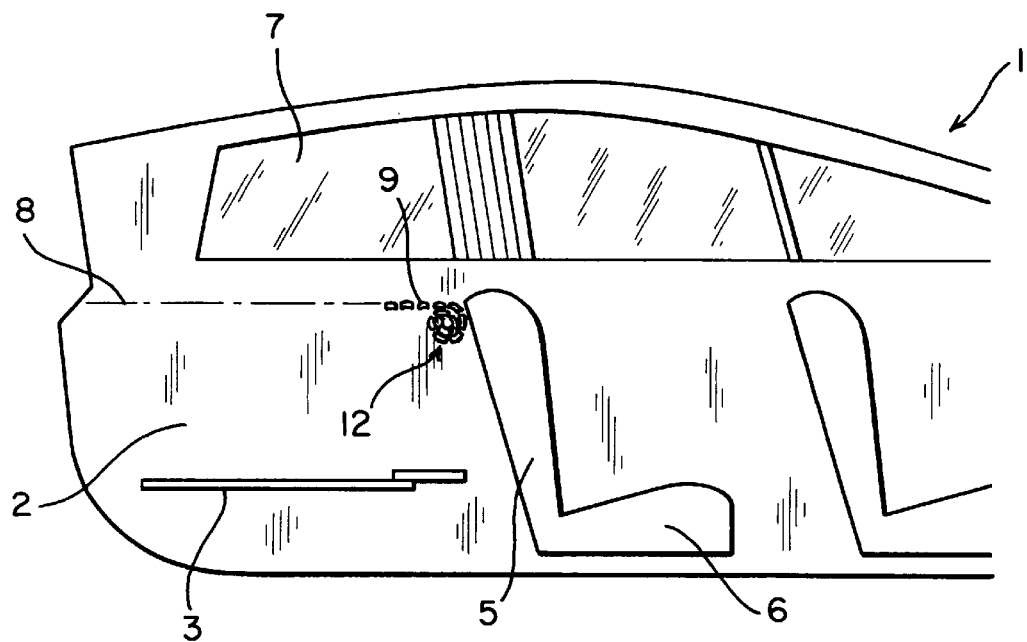
FIG. 2 is a schematic side view of the cover shade of the present invention which can be rolled up behind a seat back.
Figure 3:
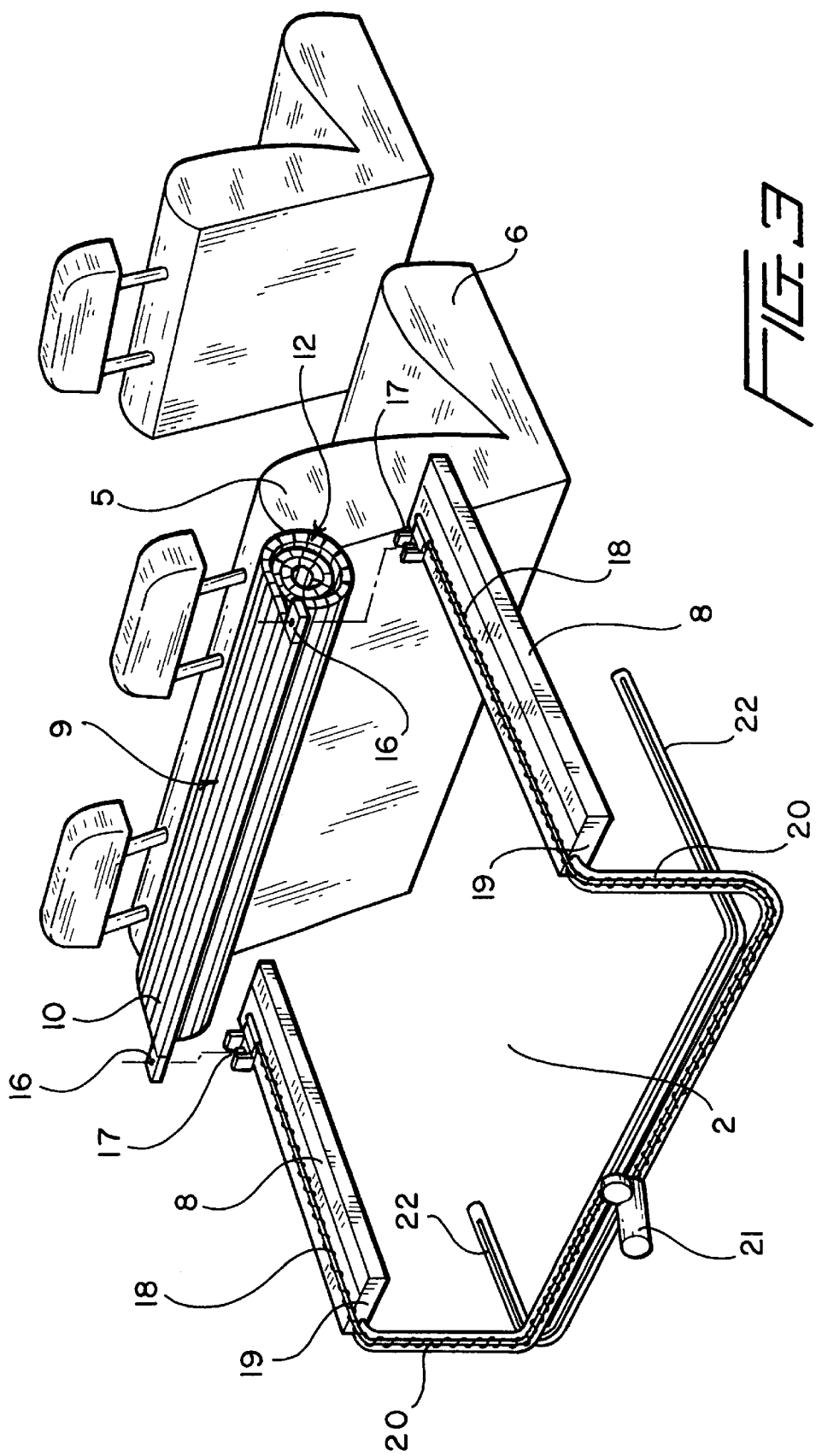
FIG. 3 is a perspective view of a partially exploded representation of the cover shade with the drive means.
Figure 4:
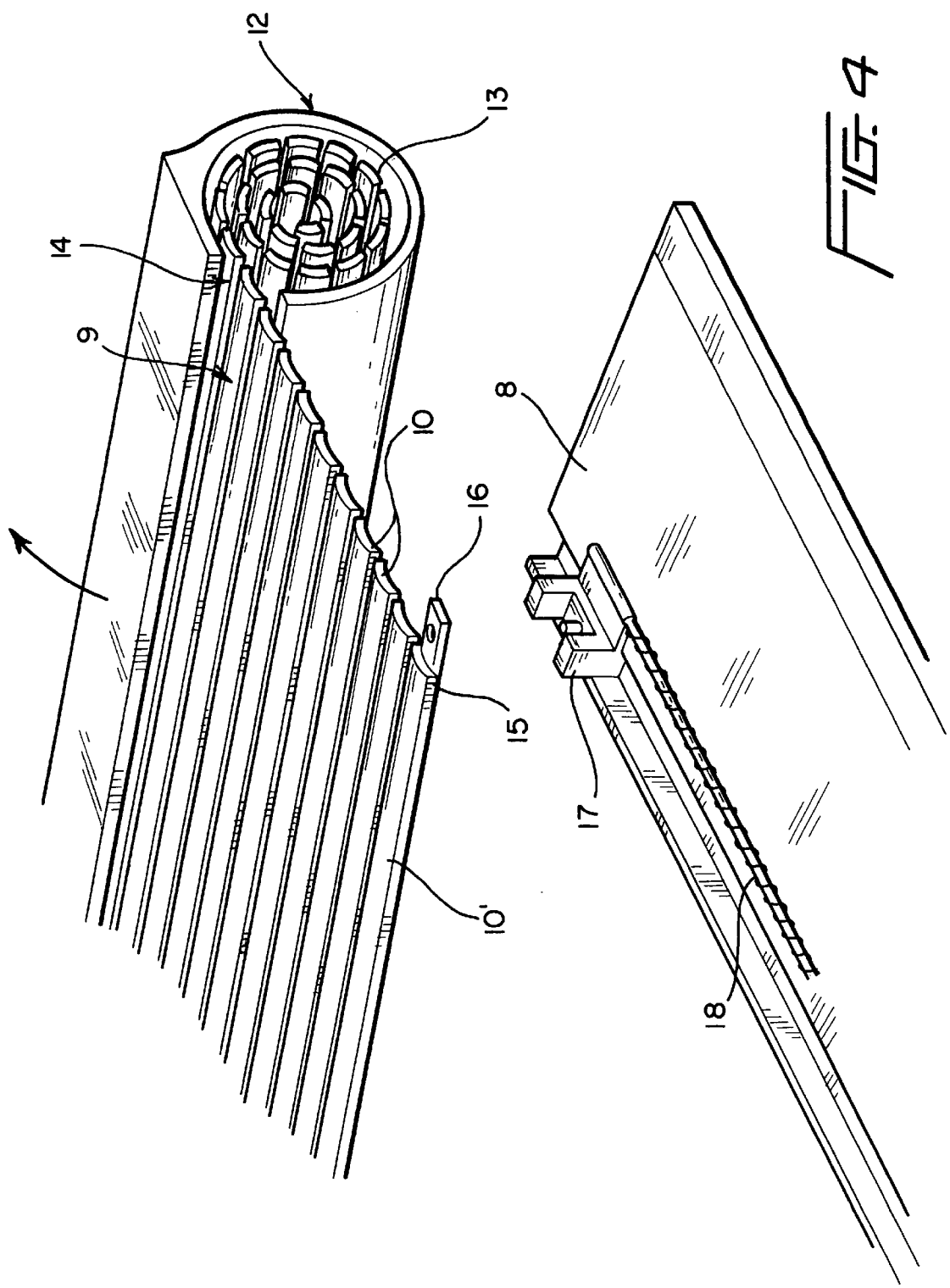
FIG. 4 is a schematic side view of a second embodiment of the cover shade of the present invention which can be accommodated in a receiving compartment on the seat back.

As shown in FIGS. 2–4, a receiving means 12 includes a roughly cylindrical roll-up space 13 for the cover shade 9. The receiving means 12 is detachably mounted on the rear seat back 5, in front of the front ends of the guide rails 8. The opened cover shade 9, which clears the cargo space 2, is wound up in the roll-up space 13. At least the first rear louver 10' projects through the opening 14 out of the receiving means 12 and detachably couples to each drive part 17 by means of coupling pans 16 which are attached to its two lateral louver ends 15. The drive part 17 is movably supported on the guide rail 8. The coupling pant 16 contains, for example, an opening (see FIG. 4) into which the journal of the drive part 17 fits when the coupling part 16 is placed on the drive part 17. Each of the two drive parts 17 (one on each side) can be moved by means of the drive cable 18 along the guide rail 8. The two drive cables 18 run along the guide rails 8 to the rear to their ends 19 (FIG. 3), then in a vertical section 20 downwards and under the cargo space bottom 3 to a drive device 21, i.e., a motor, which is located for example roughly in the vehicle middle. The two trailing ends 22 of the drive cables 18 are laid under the cargo bottom 2.

By means of the two compressively stiff drive cables 18 and the drive parts 17, the cover shade 9 can be closed by being pulled out of the roll-up space 13 and unwound. When the cover shade 9 is in its closed position covering the cargo space 2, only one or a few louvers 10 remain in the roll-up space 13. To open the cover shade 9, the cover shade 9 is pushed forward by the drive parts 17 along the guide rails 8 as the drive parts 17 are moved forward and with the drive parts 17 engaging the rear louver 10'. The louvers 10 on the front end of the cover shade 9 necessarily wind up in the cylindrical roll-up space 13. A guide means, which is not shown behind the opening 14 of the roll-up space 13, can support winding up the cover shade 9.

When the cargo space is to be enlarged to transport bulky items and the rear seat back 5 of the seat arrangement 6 is to be laid down for this purpose, the wound-up cover shade 9 with its receiving means 12 can be removed from the rear seat back 5. Here the rear louver 10' with the coupling parts 16 is detached from the drive parts 17.

Figure 5:
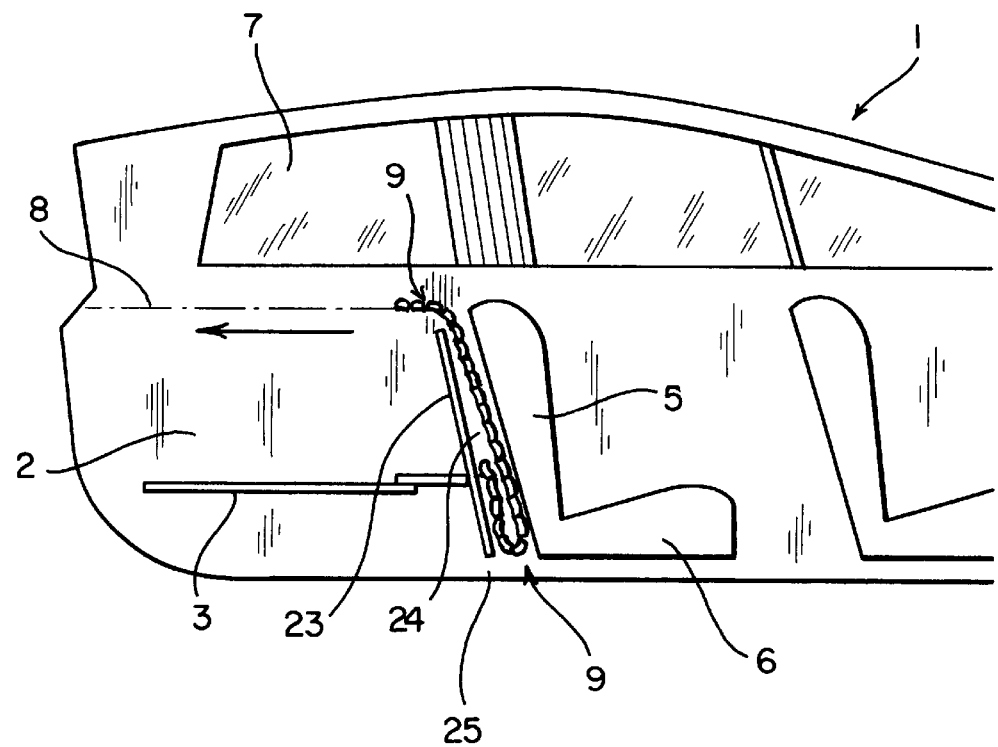
FIG. 5 is a perspective view of the cover shade shown in FIG. 4 with a drive means.
Figure 6:
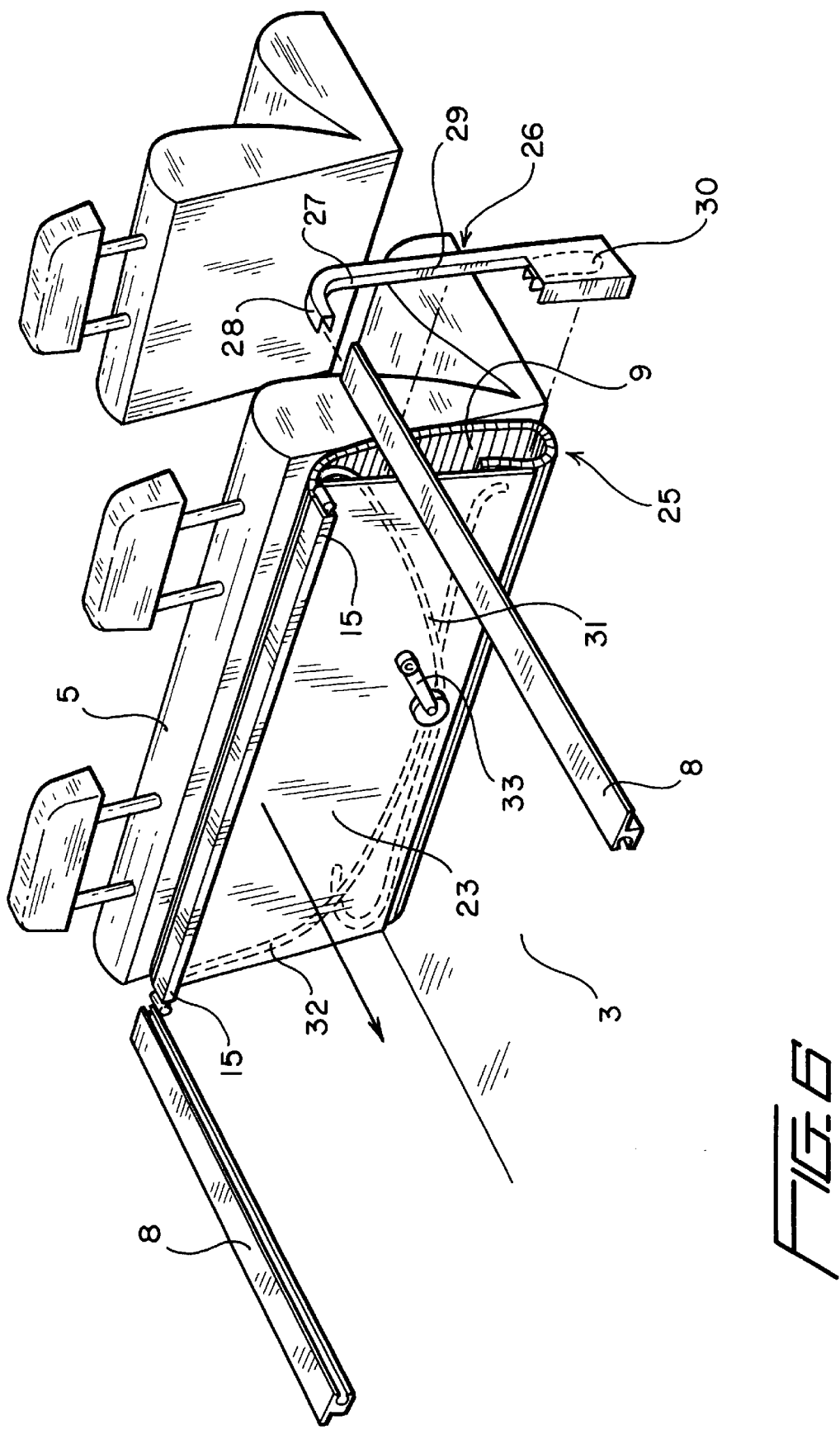
FIG. 6 is a perspective view of an enlarged partially exploded representation of the cover shade of the second embodiment.

In a second embodiment of the cover device for the cargo space 2 (FIGS. 5 and 6), the cover shade 9 is movably supported in the same way on the lateral guide rails 8. On the back of the rear seat back 5, at a distance to the rear seat back 5, a partition 23 is attached and borders the receiving space 24 of the receiving means 25 for the opened cover shade 9 towards the cargo space 2. The guide means 26 for the cover shade 9 is attached to both sides of the receiving space 24. The guide means 26 contains a rail 27 which, with its top section 28, borders the vehicle-mounted guide rail 8 such that the lateral louver ends 15 can slide from the vehicle-mounted guide rail 8 into the top section 28. The middle section 29 of the rail 27 is arranged such that the louvers 10 are guided downward directly on the back of the rear seat back 5 in the receiving space 24 until the lower section 30 of the rail 27, with a U-shaped guide, guides the louvers 10 or the cover shade 9 up again in the receiving space 24. By storing the cover shade 9 by folding, a longer cover shade 9 can be stored in a space-saving manner behind the rear seat back 5. If necessary, there can also be additional upper deflection for the cover shade 9 in order to achieve tighter storage.

The cover shade 9 can be moved via two drive cables 31 and 32 which are connected to the right and the left side of the cover shade 9, for example on the two lateral louver ends 15 of the rear louver 10' or also another louver 10. The two drive cables 31 and 32 run in the receiving space 24 to the drive motor 33 which is located in the area of the receiving space 24 and drives the two drive cables 31 and 32 synchronously for closing and also opening. The drive motor 33 may be mounted or positioned on the seat arrangement 5.

When the cover shade 9 is opened and pushed completely forward into the receiving space 24 (FIGS. 5 and 6), the rear seat back 5 can be folded forward. In doing so, the partition 23 and the receiving space 24 are folded forward with the cover shade 9 including the lateral guide means 26 and the drive means, the lateral guide means 26 being separated from the vehicle-mounted guide rails 8. When using flexibly laid, bendable drive cables, the drive motor can also be located under the cargo space bottom 3 for example and the drive cables 31, 32 can follow the folding motion of the seat back 5.

A switch 34 (FIG. 1) for actuating the drive motor is attached, for example, to end of the lateral guide rail 8.

I claim:

1. A device for covering an interior cargo space of a passenger vehicle having a seat arrangement, comprising:

lateral guide rails extending within the cargo space from near a rear side of the seat arrangement to near a rear end of the cargo space;

a cover shade including flexurally stiff louvers, said cover shade being movably guided on said lateral guide rails and transferable into a storage position in a receiving means located on a seat back of the seat arrangement to open the cargo space; and a drive means connected to said cover shade for opening and closing said cover shade.

2. The device of claim 1, wherein the drive means includes a drive motor with two synchronously drivable drive cables which drive the cover shade on two lengthwise sides.

3. The device of claim 1, wherein the cover shade is positioned in a storage position when opened, said cover shade being removable from said storage position.

4. The device of claim 1, wherein the cover shade is mounted in a manner enabling the cover shade to be rolled up at a front end of the guide rails, said cover shade being detachably connected to the drive means.

5. The device of claim 2, wherein the drive motor is located under a bottom of said cargo space.

6. The device of claim 1, wherein said drive means includes drive parts movably supported on the lateral guide rails, said cover shade being detachably connected to the drive parts.

7. The device of claim 1, wherein the receiving means includes a receiving space, said receiving means being located behind the seat back and containing lateral guide means for the cover shade to keep the cover shade orderly in the receiving space, said lateral guide means adjoining the glide rails when the seat back is folded up.

8. The device of claim 7, wherein the lateral guide means includes a bottom having a U-shaped guide section for deflecting the cover shade.

9. The device of claim 1, wherein the drive means includes compressively stiff drive cables guided on the receiving means and connected to the cover shade.

10. The device of claim 1, wherein the drive means includes a drive motor mounted on the seat arrangement.

* * * * *